Figure 3:
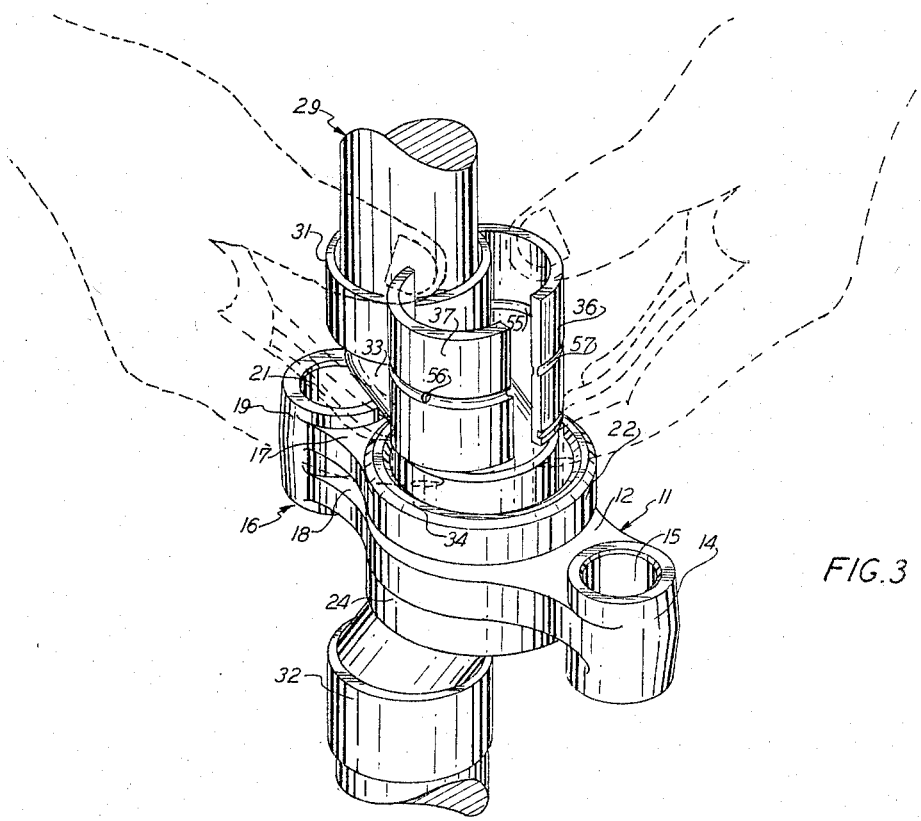

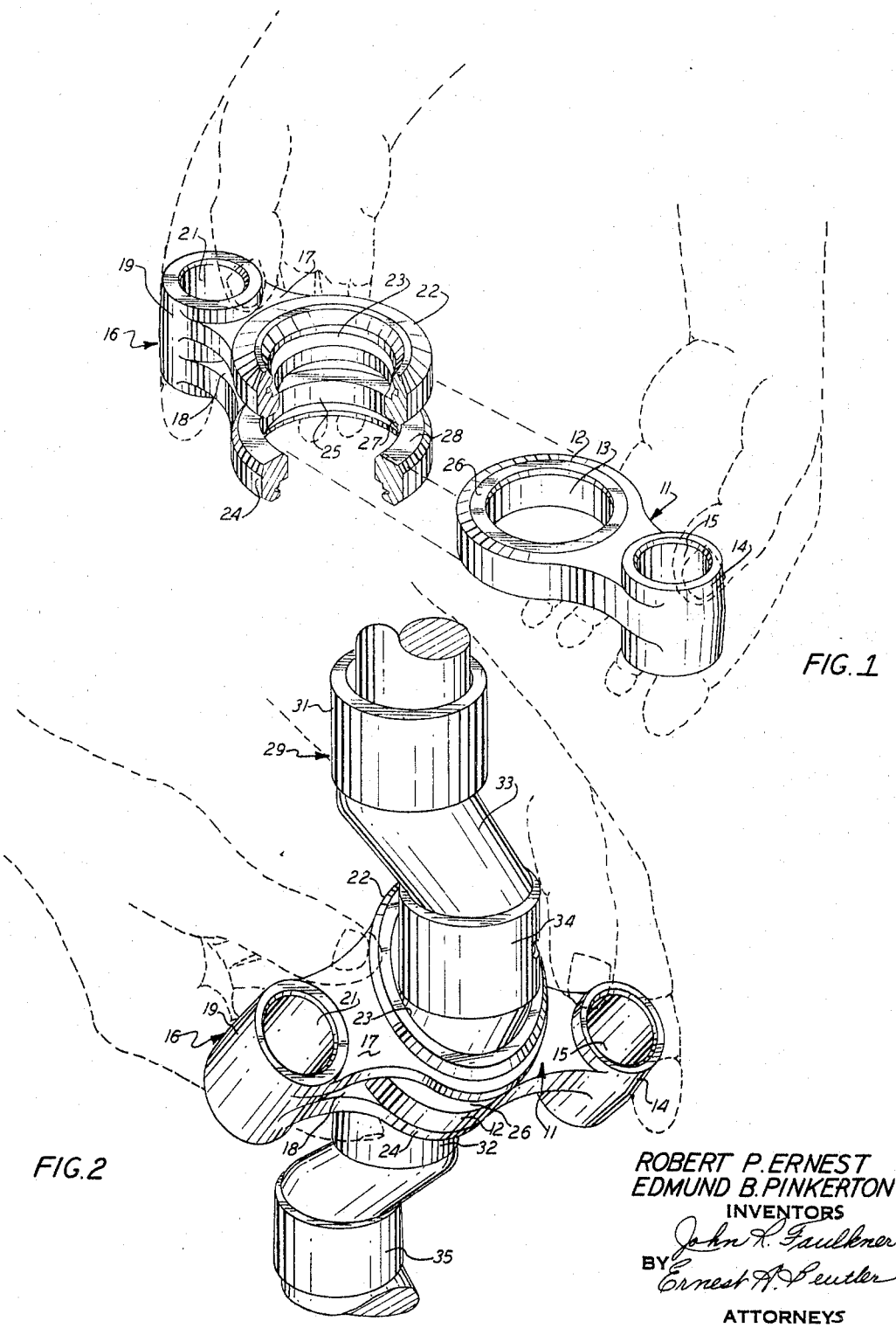

Oct. 18, 1966   R. P. ERNEST ET AL   3,279,267
RECIPROCATING MACHINE AND A METHOD FOR ASSEMBLING IT
Filed Sept. 30, 1964   5 Sheets-Sheet 2

ROBERT P. ERNEST
EDMUND B. PINKERTON
INVENTORS

BY John R. Faulkner
Ernest H. Leutter
ATTORNEYS

ROBERT P. ERNEST
EDMUND B. PINKERTON
INVENTORS

United States Patent Office 3,279,267
Patented Oct. 18, 1966

3,279,267
RECIPROCATING MACHINE AND A METHOD
FOR ASSEMBLING IT
Robert P. Ernest, Dearborn Heights, and Edmund B.
Pinkerton, Livonia, Mich., assignors to Ford Motor
Company, Dearborn, Mich., a corporation of Delaware
Filed Sept. 30, 1964, Ser. No. 400,429
17 Claims. (Cl. 74—44)

This invention relates to a reciprocating machine and a method for assembling it and more particularly to a reciprocating type of internal combustion engine and a method by which it may be assembled. This application is a continuation-in-part of our co-pending patent application entitled "Piston And Connecting Rod Assembly," S.N. 91,750, filed February 27, 1961, now abandoned.

In the normal reciprocating pump or engine, motion is transmitted from a rotating crankshaft to a reciprocating piston through a connecting rod. One end of the connecting rod is journaled upon a connecting rod journal that is formed upon a crankshaft and is offset from the axis of rotation of the crankshaft by a throw. In a multicylinder engine, a plurality of throws and connecting rod journals may be provided. It also is conventional to provide some form of friction reducing bearing surface between the connecting rod and the connecting rod journal of the crankshaft.

The bearing surface that is positioned between the connecting rod and the connecting rod journal of the crankshaft may wear and require replacement. It is most desirable to employ a replaceable bearing surface that may be readily serviced without necessitating replacement or resurfacing of the entire connecting rod.

When plain bearings have been used it has heretofore been necessary to split the connecting rod in the area of its journal upon the crankshaft to facilitate removal and replacement of the bearings. The splitting of the connecting rod has several disadvantages. When the connecting rod is split, some means must be provided to secure the connecting rod halves together. In addition to adding to the cost of the assembly, these fastening means require the provision of additional material to the connecting rod to reduce unit stresses in the resulting high stress concentration area. The additional material not only adds to the weight of the connecting rod but also requires additional counterbalancing weight on the crankshaft to compensate for the heavier reciprocating mass. Larger bearings also must be used. The cost disadvantage of the split connecting rod, therefore, is magnified by the necessity of providing additional material to other components.

It is an object of this invention to provide a reciprocating machine and method by which it may be assembled that permits the use of a unitary connecting rod with replaceable bearing surfaces.

A unitary connecting rod may be employed provided it has a crankshaft journal that is sufficiently large to enable it to be threaded over the crankshaft. In the conventional engine, cheeks on opposing surfaces of the crankshaft throw contact the connecting rod to axially locate it upon the crankshaft. If a unitary connecting rod is provided, however, these cheeks cannot be relied upon for this purpose.

It is a further object of this invention to provide a unique structure and method for axially locating a connecting rod upon a crankshaft.

A reciprocating machine embodying this invention comprises a crankshaft and a unitary connecting rod having a crankshaft journal bore that is sufficiently large to permit the connecting rod to be threaded axially onto a connecting rod journal of the crankshaft. Bearing means are interposed between the axially aligned journals of the connecting rod and crankshaft. A piston is journaled upon the end of the connecting rod remote from its crankshaft journal. The journal between the piston and the connecting rod is constructed so that the piston and connecting rod cannot move relative to each other in the direction of the axis of the rotation of the crankshaft. The piston is received within a cylinder in such a manner that the piston and accordingly the connecting rod cannot move axially with respect to the cylinder. This axially locates the connecting rod and its bearings upon the crankshaft.

The method of assembling the reciprocating machine described in the foregoing paragraph comprises the steps of threading the crankshaft journal of the unitary connecting rod axially along the crankshaft to a position in axial alignment with a connecting rod journal of the crankshaft. Bearing means are inserted between the axially aligned journals of the connecting rod and the crankshaft. A piston is then journaled upon the end of the connecting rod remote from the crankshaft journal in such a manner as to preclude relative movement between the piston and the connecting rod in the direction of the axis of the crankshaft. The piston is then inserted into a cylinder for reciprocation with the cylinder.

In reciprocating machines having opposed, radial or V type cylinder arrangements it is common practice to journal more than one connecting rod upon a single crankshaft throw. It is necessary in this type of machine construction to axially locate each of the connecting rods with respect to the crankshaft journals.

It is a still further object of this invention to provide a unique and simplified manner for axially locating a plurality of connecting rods upon a single crankshaft journal.

A reciprocating machine accomplishing the results described in the foregoing paragraph is characterized by the provision of a plain connecting rod that has its crankshaft journal portion received between axially spaced blades of a forked connecting rod. The contact between the two connecting rods axially locates them with respect to each other. The connecting rods then may be axially located upon a crankshaft journal by closely fitting only one of the connecting rods to its respective piston so that no relative axial movement is provided between the connecting rod and its piston. The other connecting rod will then be axially located upon the crankshaft because of the interengagement between the connecting rods.

As an alternative to the foregoing embodiment, it is proposed to form the journal between one connecting rod and its respective piston in such a manner that the piston and connecting rod cannot move relative to each other in a first direction along the axis of rotation of the crankshaft. The other piston and connecting rod are journaled in such a manner that they cannot move with respect to each other in a direction along the axis of rotation of the crankshaft opposite to the first direction.

Figure 4:
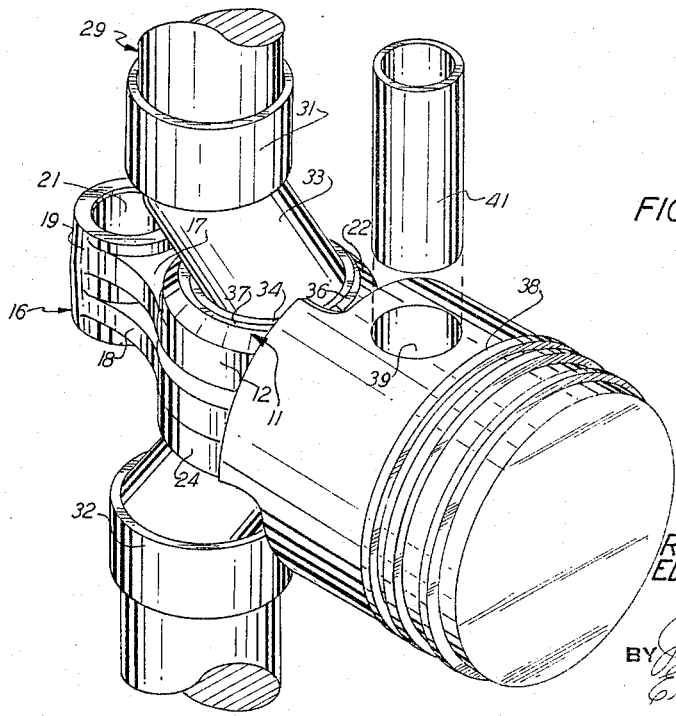
Figure 5:
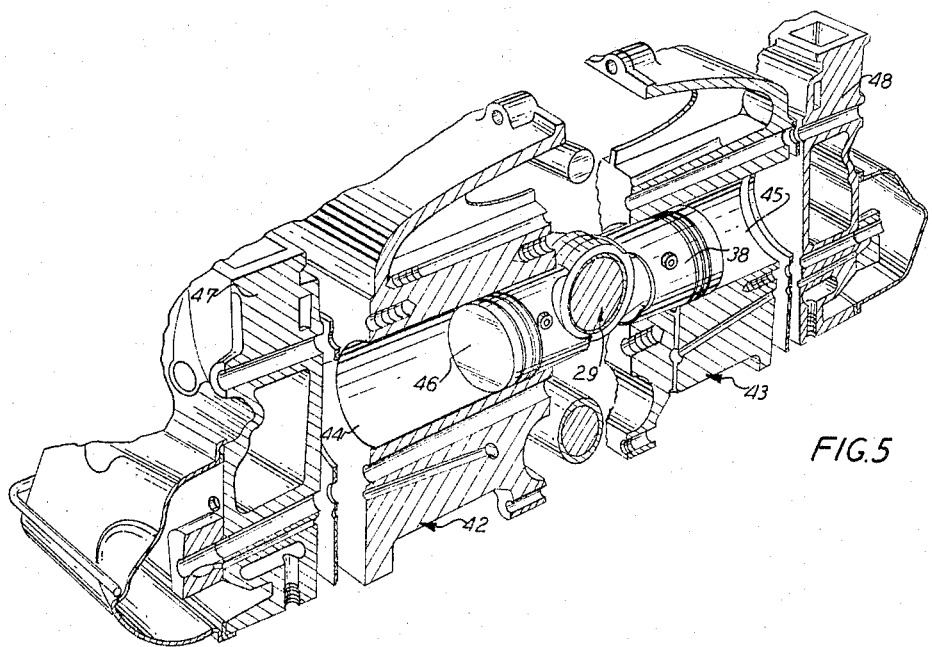
Figure 6:
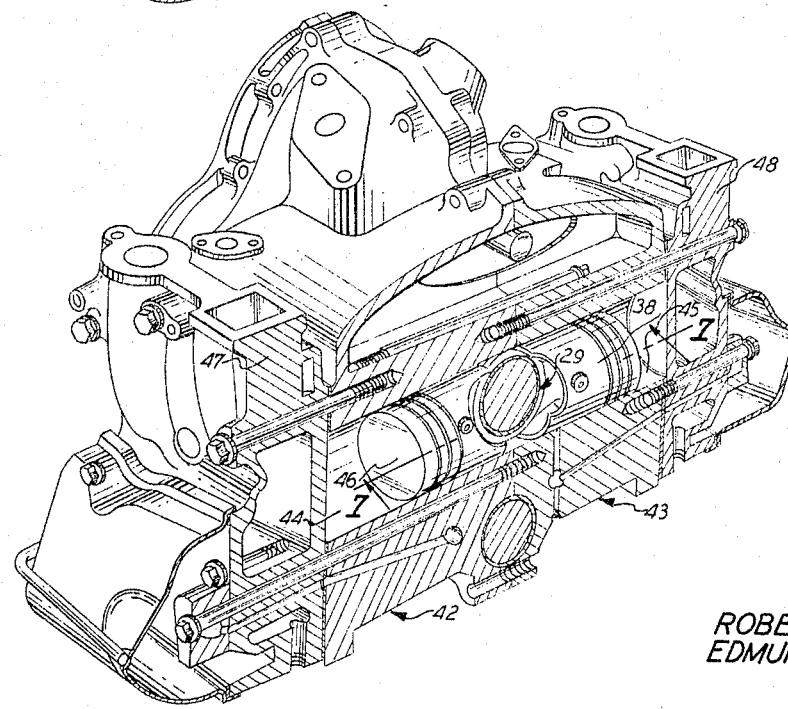
Figure 7:
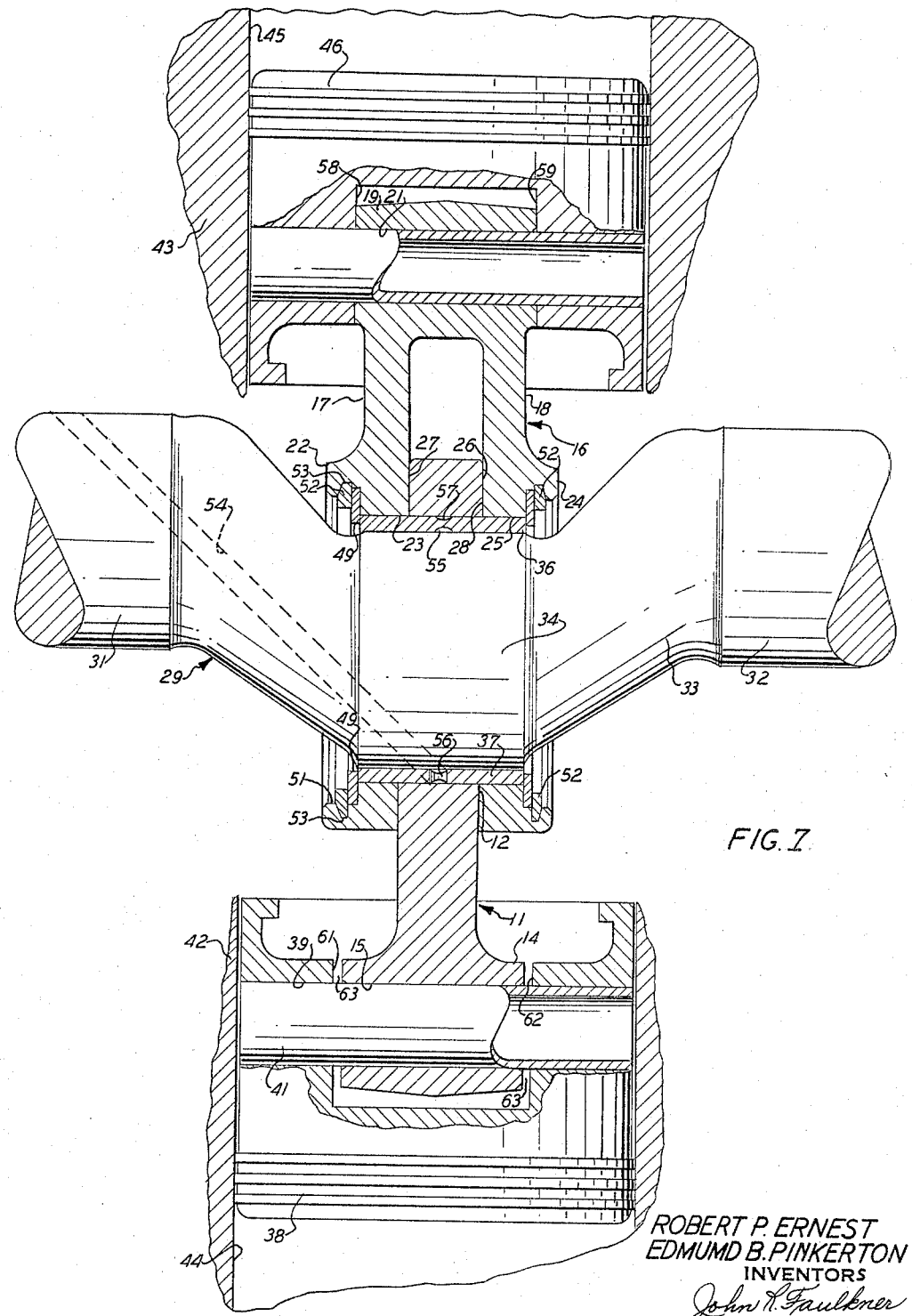
Figure 8:
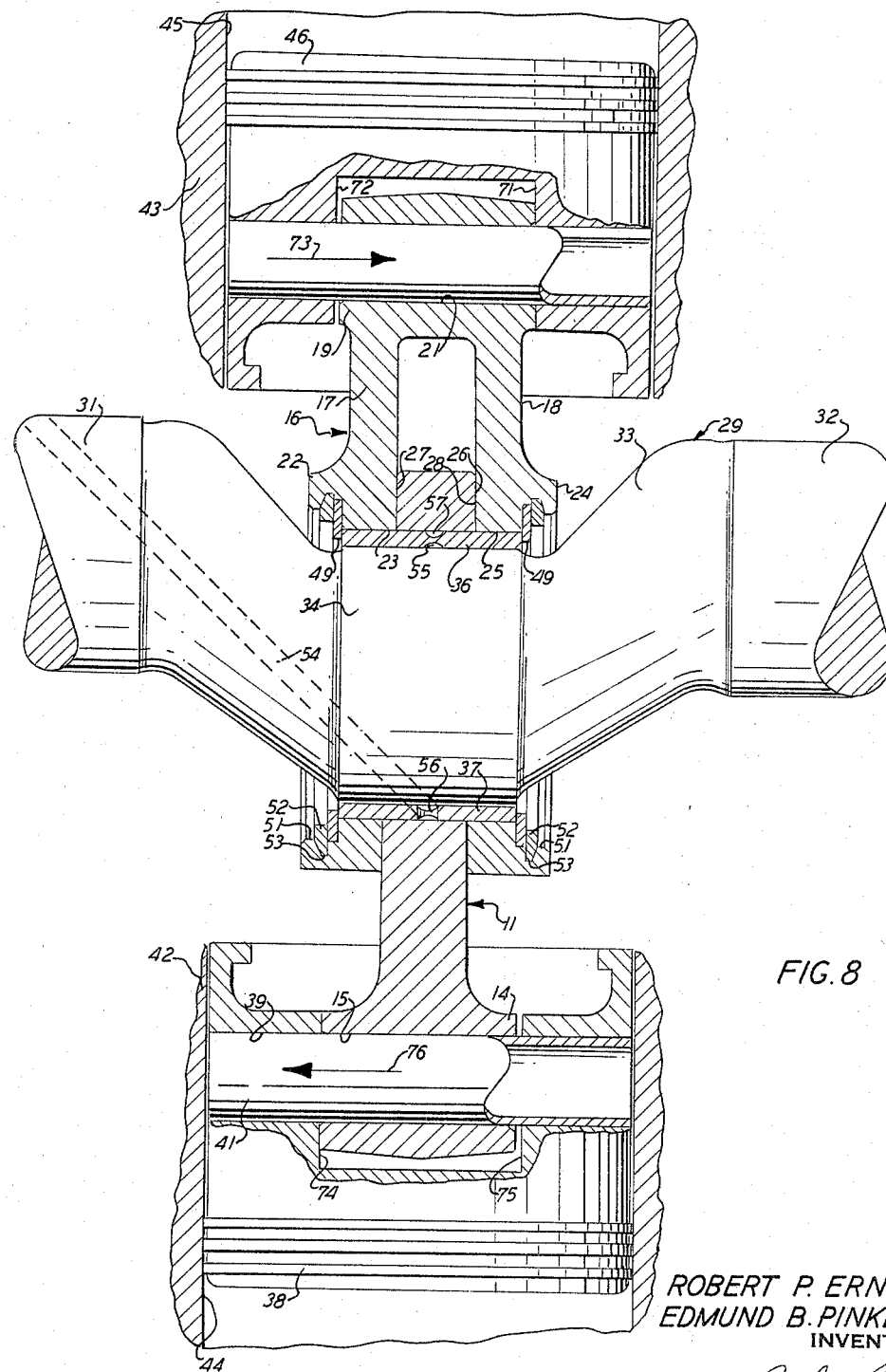

Further objects and advantages of this invention will become more apparent as this description proceeds particularly when considered in conjunction with the accompanying drawings, wherein:

FIGURES 1–6 are perspective views showing the various steps of assembling a reciprocating machine embodying this invention, FIGURE 7 is a cross-sectional view taken generally along the line 7—7 of FIGURE 6, FIGURE 8 is a cross-sectional view, in part similar to FIGURE 7, showing another embodiment of this invention.

Referring now in detail to the drawings and in particular to FIGURE 1, a unitary, plain connecting rod is indicated by the reference numeral 11. The plain connecting rod 11 has an integral crankshaft journal end 12 with an enlarged crankshaft journal 13 formed entirely therein. A piston pin end 14 of the plain connecting rod 11 is formed with a piston pin journal 15.

A unitary forked connecting rod is indicated generally by the reference numeral 16. The forked connecting rod 16 has a pair of axially spaced blades 17 and 18 that are integrally connected to a piston pin end 19 formed with a piston pin journal 21. The blade 17 terminates in a crankshaft journal end 22 in which a crankshaft journal 23 is formed. The blade 18 terminates in a crankshaft journal end 24 that is formed with a crankshaft journal 25. The crankshaft journals 23 and 25 of the forked connecting rod 16 and the crankshaft journal 13 of the plain connecting rod 11 have the same internal diameter.

The first step of assembling the disclosed machine, which is an opposed cylinder internal combustion engine, comprises inserting the crankshaft journal end 12 of the plain connecting rod 11 between the crankshaft journal ends 22 and 24 of the blades 17 and 18 of the forked connecting rod 16. Opposed machined surfaces 26 of the plain connecting rod are contacted by opposed machined surfaces 27 and 28 of the crankshaft journal ends 22 and 24 of the forked rod 16. The contact between the machined surfaces 26, 27 and 28 prevents relative axial movement between the connecting rod assembly formed by the plain connecting rod 11 and the forked connecting rod 16. When the connecting rod assembly is completed, the crankshaft journals 13, 23 and 25 are axially aligned to provide a continuous crankshaft journal.

Referring now to FIGURE 2, the engine also includes a multiple throw crankshaft, indicated generally by the reference numeral 29. The crankshaft 29 has one throw for each pair of cylinders. That is, if an eight cylinder engine is to be used, the crankshaft will have four throws. The depicted engine is of the four cylinder variety so that two throws are provided. Describing the crankshaft now in detail, it is provided with at least two longitudinally spaced, coaxial main bearing portions 31 and 32. A throw 33 forming a connecting rod journal 34 is positioned between the main bearing portions 31 and 32. A similar throw and connecting rod journal, indicated generally at 35, is axially spaced from the throw 33.

The diameter of the crankshaft journals 13, 23 and 25 of the connecting rods 11 and 16 is made sufficiently large to permit the connecting rod assembly which has previously been completed to be threaded axially along the crankshaft 29 as shown in FIGURE 2 without necessitating splitting of the individual connecting rods. The connecting rod assembly is threaded along the crankshaft 29 to a position in axial alignment with the connecting rod journal 34 of the throw 33. It is to be understood that a similar connecting rod assembly also is threaded into axial alignment with the throw and journal 35 in the same manner.

Referring now to FIGURE 3, when the connecting rod assembly is axially aligned with the connecting rod journal 34 a gap exists between the external surface of the journal 34 and the crankshaft journals 13, 23 and 25. This gap is a result of the enlarged diameter of the journals 13, 23 and 25 that permits the threading of the connecting rod assembly onto the crankshaft. A segmented plain bearing assembly, indicated by the reference numerals 36 and 37, is inserted into the gap to provide friction reducing surfaces between relatively moving parts. It is to be understood that this operation is repeated for each connecting rod crankshaft. The bearing assembly 36 and 37 will be described in more detail as this description proceeds particularly in reference to FIGURE 7.

After the bearing segments 36 and 37 are interposed between the connecting rods 11 and 16 and a crankshaft 29, a piston, indicated generally by the reference numeral 38, is fitted onto the connecting rod 11 (FIGURE 4). The piston 38 is provided with a bore 39 that is substantially the same diameter as the piston pin bore 15 of the connecting rod 11. A piston pin 41 is fitted into the bores 39 and 15 to journal the piston 38 upon the connecting rod 11. The piston 38 also coacts with the connecting rod 11 to axially locate the connecting rod assembly on the crankshaft 29 as will be described by reference to FIGURES 7 and 8. It is to be understood that a piston is fitted to the forked connecting rod 16 in the same manner. Pistons also are journaled upon each of the individual connecting rods of the other connecting rod assembly. Piston rings may then be inserted onto each piston if desired.

When the pistons are all assembled onto the connecting rod, they are positioned on opposite sides of a plane containing the axis of the crankshaft 29 and each piston is slid into the cylinder bore of a cylinder block (FIGURE 5). In the illustrated engine, horizontally disposed cylinder blocks, indicated generally by the reference numerals 42 and 43 are provided. Each of the cylinder blocks 42 and 43 has one or more cylinder bores 44 and 45, respectively, for receipt of the piston 38, which has been described, and a piston 46 that is connected to the forked connecting rod 16. Since the engine is the opposed cylinder type, the cylinder blocks 42 and 43 are drawn toward each other from opposite horizontal directions. The bearings (not shown) for the crankshaft main bearing journals 31 and 32 also are inserted at this time in any suitable manner. When the cylinder blocks 42 and 43 are in place, cylinder heads 47 and 48 may be assembled to the cylinder blocks. Other components of the engine are then added and the engine may be bolted together by means of the bolting arrangement illustrated and described in Patent No. 3,059,623, issued October 23, 1962, and entitled "Bolting Arrangement for Reciprocating Machinery."

The bearing construction for reducing friction between the connecting rods 11 and 16 and the crankshaft 29 will now be described in detail by reference to FIGURES 3 and 7. The bearing segments 36 and 37 are each semi-cylindrical and have a full floating relationship to the connecting rods 11 and 16 and to the crankshaft 29. That is, there is sufficient clearance between the inside of the journals 13, 23 and 25 and the outer diameter of the bearing segments 36 and 37 to permit free relative rotation between the connecting rods 11 and 16 and the bearing segments 36 and 37. In a like manner, there is sufficient clearance between the inner diameter of the bearing segments 36 and 37 and the outer surface of the connecting rod journal 34 of the crankshaft 29 to permit relative rotation.

The bearing segments 36 and 37 are engaged at each of their ends by retainers 49 that are positioned within enlarged bores 51 formed in opposite surfaces of the blades 17 and 18 of the forked connecting rod 16. Snap rings 52 are received in grooves 53 formed in the blades 17 and 18 to prevent axial movement of the retainers 49 and the bearing segments 36 and 37.

The respective bearing surfaces may be lubricated by means of a transverse passage 54 that extends through the crankshaft 29 from the main bearing portion 31 through the throw 33 to the connecting rod journal 34. A circumferential groove 55 extends around the inside of the bearing segments 36 and 37 in registry with the outer end of the passage 54. One or more radially extending holes 56 may be drilled through the bearing segments 36 and 37 from the groove 55 to a complementary groove 57 formed in the outer diameter of the bearing segments 36 and 37. Oil may flow through these passages, holes, and grooves to lubricate the journals 13, 23 and 25 of the connecting rods 16 and 11.

As has been noted, the connecting rods 11 and 16 are not axially located upon the crankshaft 29 by means of any interengagement between the crankshaft 29 and the connecting rods. FIGURE 7 illustrates one embodiment that may be used to axially locate the connecting rod assembly upon the crankshaft 29. In this embodiment, the piston 46 is formed with a pair of machined internal shoulders 58 and 59 that engage opposite machined surfaces of the piston pin end 19 of forked connecting rod 16. The intimate contact between the piston 46 and the connecting rod 16 precludes relative movement between the piston 46 and the connecting rod 16 in the direction of the axis of rotation of the crankshaft 29. The interengagement between the piston 46 and the cylinder bore 44 axially locates the piston 46 with respect to the cylinder block and accordingly, provides location for the connecting rod 16 with respect to the crankshaft 29. The interengagement between the plain connecting rod 11 and the blades 17 and 18 of the forked connecting rod 16 also locate the plain connecting rod 11 axially upon the crankshaft 29. Therefore, there is no need to machine the inner surfaces 61 and 62 of the piston 38 or the adjacent surfaces of the connecting rod 11. A clearance may be provided between these surfaces as indicated by the reference numeral 63.

The method for axially locating the connecting rods upon the crankshaft described in the preceding paragraph lends itself to engines that have only a single connecting rod journaled upon each crankshaft throw. The assemblage also permits locating of more than one connecting rod through the machining of only a single piston. In this embodiment, however, two surfaces of the piston must be machined.

Referring to the embodiment shown in FIGURE 8, a structure is disclosed wherein the connecting rod assembly may be axially located through machining of only a single surface of each piston. Parts in FIGURE 8 that are the same as parts in the previous figures have been identified by the same reference numerals and will not be redescribed.

In the embodiment shown in FIGURE 8, the piston 46 that is supported upon the connecting rods 16 has a machined surface, indicated generally at 71, that is positioned in engagement with a machined side of the piston pin end 19 of the connecting rod 16. A clearance, indicated generally at 72, is provided between the opposite end of the piston pin end 19 and the piston 46. The interengagement between the surface 71 and the connecting rod 16 limits the movement of the connecting rod 16 axially with respect to the piston 46 and crankshaft 29 in the direction identified by the arrow 73. This direction is parallel to the axis of rotation of the crankshaft 29.

The piston 38 is formed with a machined surface 74 that engages a machined side of the piston pin end 15 of the plain connecting rod 11 that is opposite to the side of interengagement between the piston 46 and the connecting rod 16. A clearance, indicated generally by the reference numeral 75, may be provided between the opposite side of the piston 38 and the connecting rod 11. It should be readily apparent that the interengagement between the machined surface 74 and the connecting rod 11 precludes movement of the connecting rod 11 in the direction indicated by the arrow 76. This direction is also parallel to the axis of rotation of crankshaft 29 but is opposite to the direction of the arrow 73.

Since the interengagement between the piston 38 and the connecting rod 11 limits the movement in the direction 76 and the interengagement between the piston 46 and the connecting rod 16 precludes movement in the direction of the arrow 73, there cannot be any relative axial movement between the connecting rod assembly and the crankshaft 29. This is possible because the connecting rods 11 and 16 cannot move axially with respect to each other. It should be readily apparent that this embodiment permits axial positioning of the assembly through the machining of only a single surface of each piston. This construction permits identical pistons to be used in all of the cylinder bores of the engines. All that must be done is reverse the direction of insertion of the opposing pistons of each connecting rod assembly.

It is to be understood that various changes and modifications may be made without departing from the spirit and scope of the invention, as defined by the appended claims.

We claim:

1. The method of assembling a reciprocating machine comprising the steps of threading a crankshaft journal of a unitary connecting rod axially along a crankshaft to a position in axial alignment with a connecting rod journal of said crankshaft, inserting bearing means between the axially aligned journals of said connecting rod and said crankshaft, journaling a piston upon the end of said connecting rod remote from said crankshaft journal, the journal between said piston and said connecting rod being effective to preclude relative movement between said piston and said connecting rod in the direction of the axis of said crankshaft, and inserting said piston into a cylinder for reciprocation of said piston within said cylinder and rotation of said crankshaft about its axis, the positioning of said piston within said cylinder being effective to preclude movement of said piston and said connecting rod axially relative to said crankshaft.

2. The method of assembling a reciprocating machine comprising the steps of threading a crankshaft journal of a unitary connecting rod axially along a crankshaft to a position in axial alignment with a connecting rod journal of said crankshaft, inserting segmented plain bearing means between the axially aligned journals of said connecting rod and said crankshaft, journaling a piston upon the end of said connecting rod remote from said crankshaft journal, the journal between said piston and said connecting rod being effective to preclude relative movement between said piston and said connecting rod in the direction of the axis of said crankshaft, and inserting said piston into a cylinder for reciprocation of said piston within said cylinder and rotation of said crankshaft about its axis, the positioning of said piston within said cylinder being effective to preclude movement of said piston and said connecting rod axially relative to said crankshaft.

3. The method of assembling a reciprocating machine comprising the steps of inserting a crankshaft journal end of a unitary plain connecting rod between the blades of a forked crankshaft journal end of a unitary forked connecting rod, said connecting rods forming a connecting rod assembly having axially aligned crankshaft journals extending through the blades of said forked connecting rod and through the crankshaft journal end of said plain connecting rod, threading the crankshaft journal of said connecting rod assembly axially along a crankshaft to a position in axial alignment with a connecting rod journal of said crankshaft, inserting bearing means between the axially aligned journals of said connecting rod assembly and said crankshaft, journaling a piston upon the end of each of said connecting rods remote from its crankshaft journal, the journal between said pistons and said connecting rods being effective to preclude relative movement between said pistons and said connecting rod assembly in the direction of the axis of said crankshaft, and inserting each of said pistons into a cylinder for reciprocation of said pistons within said cylinders and rotation of said crankshaft about its axis, the positioning of said pistons within said cylinders being effective to preclude movement of said pistons and said connecting rod assembly axially relative to said crankshaft.

4. The method of assembling a reciprocating machine comprising the steps of inserting a crankshaft journal end of a unitary plain connecting rod between the blades of a forked crankshaft journal end of a unitary forked connecting rod, said connecting rods forming a connecting rod asembly having axially aligned crankshaft journals extending through the blades of said forked connecting rod and through the crankshaft journal end of said plain connecting rod, threading the crankshaft journal of said connecting rod assembly axially along a crankshaft to a position in axial alignment with a connecting rod journal of said crankshaft, inserting segmented plain bearing means between the axially aligned journals of said connecting rod assembly and said crankshaft, journaling a piston upon the end of each of said connecting rods remote from its crankshaft journal, the journal between said pistons and said connecting rods being effective to preclude axial movement between said pistons and said connecting rod assembly in the directon of the axis of said crankshaft, and inserting each of said pistons into a cylinder for reciprocation of said pistons within said cylinders and rotation of said crankshaft about its axis, the positioning of said pistons within said cylinders being effective to preclude movement of said pistons and said connecting rod assembly axially relative to said crankshaft.

5. The method of assembling a multi-cylinder reciprocating machine comprising the steps of threading a crankshaft journal of each of a plurality of unitary connecting rods axially along a crankshaft to a position in axial alignment with one of a plurality of axially spaced connecting rod journals of said crankshaft, inserting bearing means between each of the axially aligned journals of said connecting rods and said crankshaft, journaling a piston upon the end of each of said connecting rods remote from its crankshaft journal, the journal between each of said pistons and each of said connecting rods being effective to preclude relative movement between the respective pistons and connecting rods in the direction of the axis of said crankshaft, and inserting each of said pistons into axially spaced cylinders for reciprocation of said pistons within said cylinders and rotation of said crankshaft about its axis, the positioning of said pistons within said cylinders being effective to preclude movement of said pistons and the respective connecting rods axially relative to said crankshaft.

6. The method of assembling a multi-cylinder recirpocating machine comprising the steps of threading a crankshaft journal of each of a plurality of unitary connecting rods axially along a crankshaft to a position in axial alignment with one of a plurality of axially spaced connecting rod journals of said crankshaft, inserting segmented plain bearing means between the axially aligned journals of said connecting rod and said crankshaft, journaling a piston upon the end of each of said connecting rods remote from its crankshaft journal, the journal between each of said pistons and each of said connecting rods being effective to preclude relative movement between the respective pistons and connecting rods in the direction of the axis of said crankshaft, and inserting each of said pistons into axially spaced cylinders for reciprocation of said pistons within said cylinders and rotation of said crank shaft about its axis, the positioning of said pistons within said cylinders being effective to preclude movement of said pistons and the respective connecting rods axially relative to said crankshaft.

7. The method of assembling a reciprocating machine comprising the steps of inserting a crankshaft journal end of a unitary plain connecting rod between the blades of the forked crankshaft journal end of a unitary forked connecting rod, said connecting rods forming a connecting rod assembly having an axially aligned crankshaft journal extending through the blades of said forked connecting rod and through said plain connecting rod, threading the crankshaft journal of said connecting rod assembly axially along a crankshaft to a position in axial alignment with a connecting rod journal of said crankshaft, inserting bearing means between the axially aligned journals of said connecting rod assembly and said crankshaft, journaling a piston upon the end of each of said connecting rods remote from its crankshaft journal, the journal between one of said pistons and its respective connecting rod being effective to preclude relative movement between said one of said pistons and its respective connecting rod in directions parallel to the axis of said crankshaft, the journal between the other of said pistons and its respective connecting rod permitting free relative movement between said other of said pistons and its respective connecting rod in directions parallel to the axis of said crankshaft, the contact between the blades of said forked connecting rod and the crankshaft journal end of said plain connecting rod being effective to preclude relative movement between said connecting rods in the direction of the axis of said crankshaft, and inserting each of said pistons into a cylinder for reciprocation of said pistons within said cylinders and rotation of said crankshaft about its axis, the positioning of said pistons within said cylinders and the coaction of said pistons with said connecting rods being effective to preclude movement of said connecting rod assembly axially relative to said crankshaft.

8. The method of assembling a reciprocating machine comprising the steps of inserting a crankshaft journal end of a unitary plain connecting rod between the blades of the forked crankshaft journal end of a unitary forked connecting rod, said connecting rods forming a connecting rod assembly having an axially aligned crankshaft journal extending through the blades of said forked connecting rod and through said plain connecting rod, threading the crankshaft journal of said connecting rod assembly axially along a crankshaft to a position in axial alignment with a connecting rod journal of said crankshaft, inserting bearing means between the axially aligned journals of said connecting rod assembly and said crankshaft, journaling a piston upon the end of each of said connecting rods remote from its crankshaft journal, the journal between one of said pistons and the respective connecting rod being effective to preclude relative movement between said one of said pistons and its respective connecting rod in a first direction relative to the axis of said crankshaft, the journal between the other of said pistons and its respective connecting rod being effective to preclude relative movement between the other of said pistons and its respective connecting rod in a direction relating to the axis of said crankshaft that is opposite to said first direction, and inserting each of said pistons into a cylinder for reciprocation of said pistons within said cylinders and rotation of said crankshaft about its axis, the positioning of said pistons within said cylinders and the coaction of said pistons with said connecting rods being effective to preclude movement of said connecting rod assembly axially relative to said crankshaft.

9. The method of assembling a reciprocating machine comprising the steps of inserting a crankshaft journal end of a unitary plain connecting rod between the blades of a forked crankshaft journal end of a unitary forked connecting rod, said connecting rods forming a connecting rod assembly having an axially aligned crankshaft journal extending through the blades of said forked connecting rod and through said plain connecting rod, threading the crankshaft journal of said connecting rod assembly axially along a crankshaft to a position in axial alignment with a connecting rod journal of said crankshaft, inserting segmented plain bearing means between the axially aligned journals of said connecting rod assembly and said crankshaft, journaling a piston upon the end of each of said connecting rods remote from its crankshaft journal, the journal between one of said pistons and its respective connecting rod being effective to preclude relative movement between said one of said pistons and its respective connecting rod in a first direction relative to the axis of said crankshaft, the journal between the other of said pistons and its respective connecting rod being effective to preclude relative movement between the other of said pistons and its respective connecting rod in a direction relative to the axis of said crankshaft that is opposite to said first direction, and inserting each of said pistons into a cylinder for reciprocation of said pistons within said cylinders and rotation of said crankshaft about its axis, the positioning of said pistons within said cylinders and the coaction of said pistons with said connecting rods being effective to preclude movement of said connecting rod assembly axially relative to said crankshaft.

10. The method of assembling a reciprocating machine comprising the steps of inserting a crankshaft journal end of a unitary plain connecting rod between the blades of a forked crankshaft journal end of a unitary forked connecting rod, said connecting rods forming a connecting rod assembly having an axially aligned crankshaft journal extending through the blades of said forked connecting rod and through said plain connecting rod, threading the crankshaft journal of said connecting rod assembly axially along a crankshaft to a position in axial alignment with a connecting rod journal of said crankshaft, inserting segmented plain bearing means between the axially aligned journals of said connecting rod assembly and said crankshaft, journaling a piston upon the end of each of said connecting rods remote from its crankshaft journal, the journal between one of said pistons and its respective connecting rod being effective to preclude relative movement between said one of said pistons and its respective connecting rod in directions parallel to the axis of said crankshaft, the journal between the other of said pistons and its respective connecting rod permitting free relative movement between said other of said pistons and its respective connecting rod in directions parallel to the axis of said crankshaft, the contact between the blades of said forked connection rod and the crankshaft journal end of said plain connecting rod being effective to preclude relative movement between said connecting rods in the direction of the axis of said crankshaft, and inserting each of said pistons into a cylinder for reciprocation of said pistons within said cylinders and rotation of said crankshaft about its axis, the positioning of said pistons within said cylinders and the coaction of said pistons with said connecting rods being effective to preclude movement of said connecting rod assembly axially relative to said crankshaft.

11. The method of assembling a multi-cylinder reciprocating machine comprising the steps of inserting a crankshaft journal end of each of a plurality of unitary plain connecting rods between blades of each of a plurality of forked crankshaft journal ends of unitary forked connecting rods to form a plurality of connecting rod assemblies each comprised of one forked and one plain connecting rod, each of said connecting rod assemblies having an axially aligned crankshaft journal extending through the baldes of the forked connecting rod and through the plain connecting rod, threading the crankshaft journal of each of said connecting rod assemblies axially along a crankshaft to a position in axial alignment with one of a plurality of axially spaced connecting rod journals of said crankshaft, inserting bearing means between each of the axially aligned journals of said connecting rod assemblies and said crankshaft, journaling a piston upon the end of each of said connecting rods remote from its crankshaft journal, the journal between one of said pistons and its respective connecting rod of each of said connecting rod assemblies being effective to preclude relative movement between said one of said pistons and its respective connecting rod in a first direction relative to the axis of said crankshaft, the journal between the other of said pistons and its respective connecting rod of each of said connecting rod assemblies being effective to preclude relative movement between the said other of said pistons and its respective connecting rod in a direction relative to the axis of said crankshaft that is opposite to said first direction, and inserting each of said pistons into a cylinder for reciprocation of said pistons within said cylinders and rotation of said crankshaft about its axis, the positioning of said pistons within said cylinders and the coaction of said pistons with said connecting rods being effective to preclude movement of said connecting rod assemblies axially relative to said crankshaft.

12. The method of assembling a multi-cylinder reciprocating machine comprising the steps of inserting a crankshaft journal end of each of a plurality of unitary plain connecting rods between the blades of forked crankshaft journal ends of each of a plurality of unitary forked connecting rods to form a plurality of connecting rod assemblies each comprised of one plain connecting rod and one forked connecting rod, each of said connecting rod assemblies having an axially aligned crankshaft journal extending through the blades of its forked connecting rod and through the crankshaft journal end of its plain connecting rod, threading the crankshaft journals of each of said connecting rod assemblies axially along a crankshaft to a position in axial alignment with one of a plurality of axially spaced connecting rod journals of said crankshaft, inserting bearing means between the axially aligned journals of said connecting rod assemblies and said crankshaft, journaling a piston upon the end of each of said connecting rods remote from its crankshafts journal, the journal between one of said pistons and its respective connecting rod of each of said connecting rod assemblies being effective to preclude relative movement between said one of said pistons and its respective connecting rod in directions parallel to the axis of said crankshaft, the journal between the other of said pistons and its respective connecting rod of each of said connecting rod assemblies permitting free relative movement between said other of said pistons and its respective connecting rod in directions parallel to the axis of said crankshaft, the contact between the blades of the forked connecting rod and the crankshaft journal end of the plain connecting rod of each of said connecting rod assemblies being effective to preclude relative movement between said connecting rods in the direction of the axis of said crankshaft, and inserting each of said pistons into a cylinder for reciprocation of said pistons within said cylinders and rotation of said crankshaft about its axis, the positioning of said pistons within said cylinders and the coaction of said pistons with said connecting rods, being effective to preclude movement of said connecting rod assemblies axially relative to said crankshaft.

13. The method of assembling an opposed multi-cylinder reciprocating machine comprising the steps of threading crankshaft journals of each of a plurality of unitary connecting rods axially along a crankshaft to a position in axial alignment with one of axially spaced connecting rod journals of said crankshaft, inserting bearing means between the aligned journals of each of said connecting rods and said crankshaft, journaling pistons upon the ends of each of said connecting rods remote from their crankshaft journals, said journal between each of said pistons and said connecting rods being effective to preclude relative movement between said pistons and said connecting rods in the direction of the axis of said crankshafts, positioning said pistons and said connecting rods on opposite sides of a plane containing the axis of said crankshaft, inserting said pistons into the cylinders of opposed cylinder blocks, and securing said cylinder blocks together in opposed relationship with said crankshaft being journaled therein.

14. The method of assembling a multi-cylinder reciprocating machine comprising the steps of inserting a crankshaft journal end of each of a plurality of unitary plain connecting rods between the blades of each of a plurality of forked crankshaft journal ends of unitary forked connecting rods to form a plurality of connecting rod assemblies comprising of one forked and one plain connecting rod, each of said connecting rod assemblies having an axially aligned crankshaft journal extending through the blades of the forked connecting rod and through the plain connecting rod, threading the crankshaft journal of each of said connecting rod assemblies axially along a crankshaft to a position in axial alignment with one of a plurality of axially spaced connecting rod journals of said crankshaft, inserting bearing means between each of the axially aligned journals of said connecting rod assemblies and said crankshaft, journaling a piston upon the end of each of said connecting rods remote from its crankshaft journal, the journal between at least one of said pistons and its respective connecting rod of each of said connecting rod assemblies being effective to preclude relative movement between said one of said pistons and its respective connecting rod in at least one direction relative to the axis of said crankshaft, positioning the pistons and respective connecting rods of each of said connecting rod assemblies on opposite sides of a plane containing the axis of said crankshaft, inserting said pistons into the cylinders of opposed cylinder blocks, and securing said cylinder blocks together in opposed relationship with said crankshaft being journaled therein.

15. In an internal combustion engine, a pair of angularly disposed cylinders, a crankshaft having a bearing journal offset from the axis of rotation of said crankshaft by a throw, a forked connecting rod, a plain connecting rod having a crankshaft journal end received between the blades of a forked crankshaft journal end of said forked connecting rod, each of said connecting rods being formed as a unitary piece and having an enlarged crankshaft journal formed therein, the crankshaft journals of said connecting rods being axially aligned with the bearing journal of said crankshaft, a piston pivotally connected to the ends of each of said connecting rods remote from its crankshaft journal end, each of said pistons being reciprocable in one of said cylinders, the journal between at least one of said pistons and its respective connecting rod being effective to preclude relative movement between said one of said pistons and its respective connecting rod in at least one direction relative to the axis of said crankshaft, and bearing means interposed between the journals of said crankshaft and said connecting rods.

16. In an internal combustion engine, a pair of angularly disposed cylinders, a piston reciprocable in each of said cylinders, a crankshaft having a bearing journal, a forked rod having a wrist pin end connected to one of the pistons by a wrist pin and a forked crankshaft engaging end, a plain rod having a wrist pin end connected to the other of said pistons by a wrist pin and a plain crankshaft engaging end nested in the forked crankshaft engaging end, each of said rods being formed as a unitary piece and having an enlarged crankshaft journal formed in its crankshaft engaging end, the crankshaft journals of said rods being axially aligned with the bearing journal of said crankshaft, bearing means interposed between the journals of said crankshaft and said connecting rods, one side of the wrist pin end of said forked rod being in engagement with its respective piston for precluding axial movement between the piston and the forked connecting rod in a first direction relative to the axis of rotation of said crankshaft, and a side of the wrist pin end of said plain connecting rod being in engagement with its respective piston for precluding relative movement between said plain connecting rod and its respective piston in a direction opposite to said first direction.

17. In an internal combustion engine, a pair of angularly related cylinders, a piston reciprocable in each of said cylinders, a crankshaft having a bearing journal, a forked connecting rod having a wrist pin end connected to one of the pistons by a wrist pin and a forked crankshaft engaging end, a plain rod having a wrist pin end connected to the other of said pistons by a wrist pin and a plain crankshaft engaging end nested in the forked crankshaft engaging end, each of said rods being formed as a unitary piece having an enlarged crankshaft journal formed in its crankshaft engaging end, the crankshaft journals of said rods being axially aligned with the bearing journal of said crankshaft, bearing means disposed in said crankshaft journals and rotatable relative to said forked and plain crankshaft engaging ends, ring means securing the bearing means in said forked crankshaft engaging end against axial movement relative to said forked crankshaft engaging end, one side of the wrist pin end of said forked rod being in engagement with its respective piston for precluding axial movement between the piston and the forked connecting rod in a first direction relative to the axis of rotation of said crankshaft, and a side of the wrist pin end of said plain connecting rod being in engagement with its respective piston for precluding relative movement between said plain connecting rod and its respective piston in a direction opposite to said first direction.

References Cited by the Examiner
UNITED STATES PATENTS

| | | | |
|---|---|---|---|
| 1,037,211 | 9/1912 | De Dion et al. | 74—580 |
| 1,293,792 | 2/1919 | Jimerson | 308—237 |
| 1,804,038 | 5/1931 | Tandy | 308—237 X |
| 1,904,180 | 4/1933 | Wagner | 74—580 |
| 2,343,055 | 2/1944 | Halford | 74—580 |
| 2,652,728 | 9/1953 | Kiekhaeffer | 74—595 X |

FOREIGN PATENTS

| | | |
|---|---|---|
| 938,371 | 4/1948 | France. |
| 1,191,087 | 4/1959 | France. |
| 945,446 | 1/1964 | Great Britain. |

FRED C. MATTERN, Jr., *Primary Examiner.*

MILTON KAUFMAN, *Examiner.*

C. F. GREEN, *Assistant Examiner.*